Patented Nov. 24, 1953

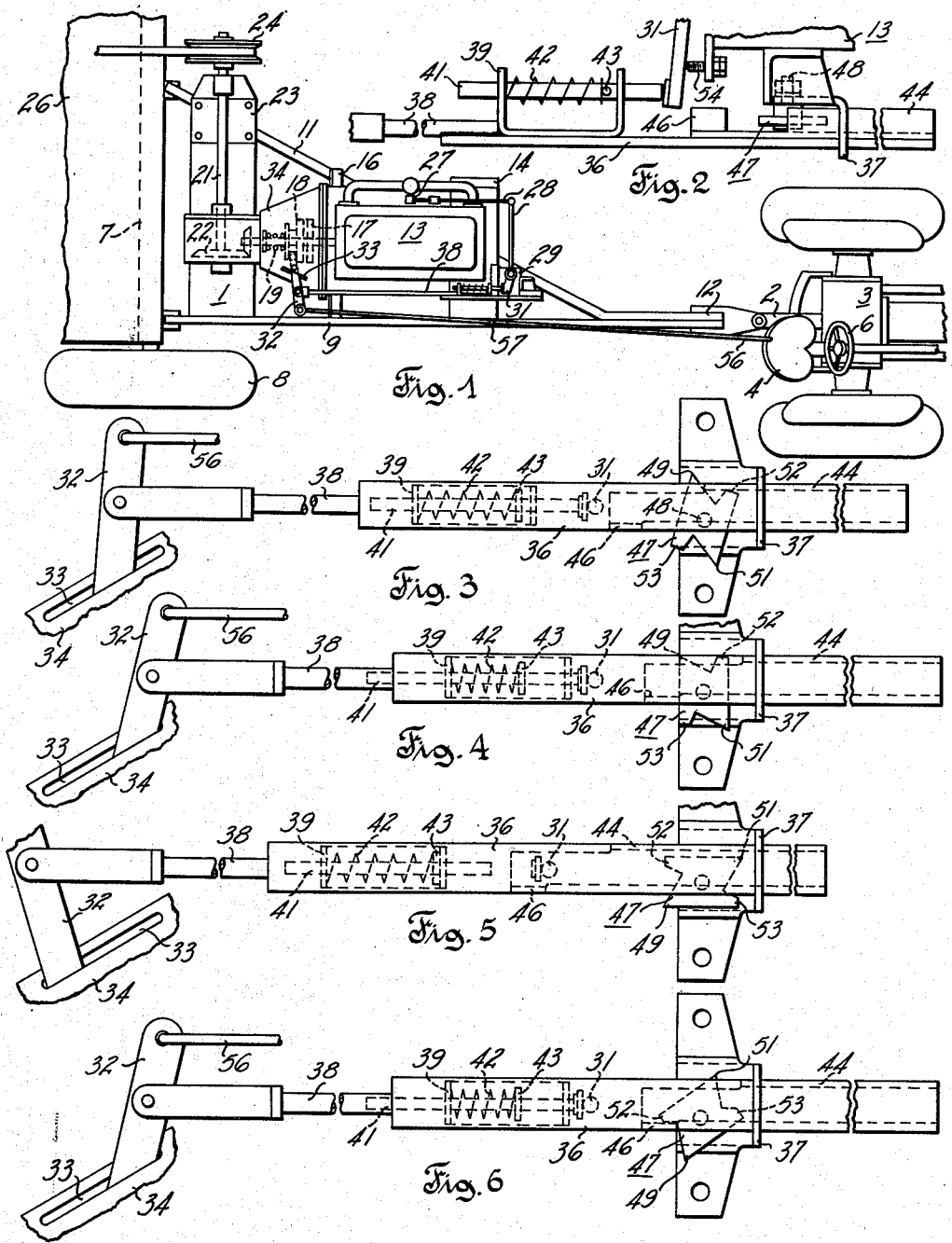

2,660,277

UNITED STATES PATENT OFFICE 2,660,277

REMOTE CONTROL FOR POWER UNITS

Robert L. Worrell, La Porte, Harry J. Lehker, North Liberty, and Francis H. Vogelsang, La Porte, Ind., assignors to Allis-Chalmers Manufacturing Company, Milwaukee, Wis.

Application March 18, 1950, Serial No. 150,402

4 Claims. (Cl. 192—.084)

This invention relates generally to the remote control of power units and is more particularly concerned with the provision of mechanism peculiarly adapted, but not limited, to the control of a power unit mounted on a mobile machine hitched in trailing relation to any suitable form of propelling vehicle, hereinafter called tractor.

In the operation of a mobile agricultural machine hitched in trailing relation to a tractor and provided with a separate power unit for driving a crop treating mechanism, for example a machine such as a combine or a one man pickup baler, it is often necessary or desirable, depending on crop conditions, to terminate operation of the crop treating mechanism. And with the type of controls heretofore commonly employed, such termination necessitates the operator stopping the tractor and then dismounting to manipulate the usual clutch and throttle controls of the power unit on the trailing machine. This procedure is extremely inconvenient and in addition wastes considerable time. Consequently, it is desirable to provide the power unit on the trailing machine with a combined clutch and throttle control means utilizing a flexible cable or the like which can be readily extended to a position within easy reach of a person seated at the operator's station on the tractor.

Numerous attempts have been made to provide power units with suitable combined clutch and throttle control means, and while some of these attempts have resulted in apparatus actuable from a remote point through the use of a cable or a like means, the apparatus of this type heretofore devised has been entirely too complicated and costly for satisfactory application and use on most agricultural machines. Moreover, in operation such machines frequently travel over uneven ground at speeds of as much or more than five miles per hour thus subjecting all control apparatus thereon to considerable shock and vibration. And it will be appreciated that trouble-free operation under such conditions, particularly when it is considered that the control mechanism on agricultural machines is often left exposed to the elements for long periods of time and that its actuation is apt to be sudden and forceful, necessitates the provision of an extremely rugged and durable foolproof mechanism. In addition, control mechanism of this type frequently encounters stalks, stems and the like of the crop being harvested or otherwise treated or by the like elements of weeds and bushes bordering the field being worked, which further increases the hazard as to satisfactory operation. Furthermore, it must be borne in mind that in addition to being rugged, durable and foolproof, a combined clutch and throttle control means for agricultural machines must also be relatively inexpensive and of a nature minimizing the time and effort necessary for the installation and adjustment thereof.

Accordingly, the present invention is directed toward and has as an object the provision of an improved clutch and throttle control means combined or combinable with the power unit of a trailing mobile machine, and including features of construction and/or combination affording a low initial cost, ruggedness, durability, etc. hereinbefore mentioned as requisites for the successful application of such control means to the power units of crop treating machines.

Consequently, the present invention may be considered as comprising the various combinations and/or details of construction designed to accomplish the foregoing and other objects of invention, as hereinafter more fully set forth in the detailed description and appended claims, reference being had to the accompanying drawing, wherein:

Fig. 1 is a plan view of a tractor and trailing mobile machine combination embodying the invention with the clutch and throttle levers shown in their respective disengaged and engine idling positions, only the rear portion of the tractor being shown in the interest of simplification;

Fig. 2 is an enlarged plan view of the major portion of the power unit control apparatus shown in Fig. 1;

Fig. 3 is an enlarged side elevation of the control mechanism shown in Fig. 1 with the cable guide pulley and most of the cable omitted;

Fig. 4 is another side elevation showing the clutch lever and associated parts in their extreme, latch releasing positions;

Fig. 5 is still another side elevation showing the clutch lever and associated parts in their clutch engaged positions; and Fig. 6 is an additional side elevation showing the clutch lever and associated parts moved to the limiting positions attained just prior to again assuming the positions shown in Fig. 3.

Referring to Fig. 1 of the drawing it will be seen that the invention is applied to a mobile agricultural machine 1 coupled in trailing relation to the drawbar structure 2 of a conventional tractor 3, the latter including an operator's station or seat 4 and the usual controls of which only the steering wheel 6 is shown. The mobile machine 1 includes a rigid frame comprising a transverse axle structure 7 mounting similar ground engaging wheels 8 adjacent opposite ends thereof (only the near wheel being shown) and a pair of forwardly converging members 9 and 11 which are joined at their forward ends to form a draft structure 12 which is coupled to the tractor drawbar 2. A power unit 13 is operatively mounted on frame members 9 and 11 by means of suitable supports 14 and 16, this unit including a power take-off mechanism comprising a longitudinally fixed clutch element 17 and a shiftable element 18 biased by a coaxial spring 19 into engaged driven relation with the fixed element 17. Power transmitted through this clutch means is delivered to a cross shaft 21 by means of bevel gearing 22. The shaft and gearing are operatively mounted on a transverse platform 23 spanning the rear portion of frame members 9 and 11, and the far end of shaft 21 is provided with a pulley 24 belt connected in power transmitting relation with a suitable soil or crop treating mechanism 26 constituting a part of machine 1. The particular mechanism driven by means of power unit 13 is in no manner essential for a complete understanding of the present invention, and it is therefore believed that the foregoing description of same should suffice.

The engine of power unit 13 includes a conventional throttle control 27 operated by means of a linkage 28 which in turn is actuated by a conventional speed governor 29 operatively connected with linkage 28. As is customary in governors of this type, it is to be understood that a governor actuated arm 31 is operatively connected with linkage 28, that this arm is biased by an internal governor spring or the like (not shown) to assume a preselected engine idling position, and that as the engine load varies, the governor arm actuates linkage 28 to maintain a constant speed as determined by the initial governor setting. Disengagement of the clutch elements 17, 18 is effected by a lever 32 projecting through a slot 33 in the clutch enclosing housing 34 and which lever 32 is pivotally mounted at a low midportion thereof within housing 34 by conventional means. In this connection it should be noted that lever 32 and governor arm 31 are both movable generally in the same direction.

Simultaneous control of the clutch and throttle levers is effected by means of a rigid bar 36 (note Fig. 2) mounted for longitudinal reciprocation in a bracket 37 carried by a forward portion of the power unit. The rear end of the bar 36 is provided with a rigid extension 38 having its rear end pivotally connected with an intermediate portion of clutch lever 32. The rear power unit side of bar 36, that is the portion immediately in front of the rear extension 38, is provided with a U-shaped bracket 39 slidably mounting a rod 41 in spaced generally parallel relation to bar 36. A compression spring 42 surrounds rod 41 intermediate the legs of bracket 39 with the rear end of the spring abutting the rear leg of the bracket and with its forward end abutting a pin 43 inserted transversely through a portion of rod 41 immediately adjacent the inner side of the forward leg of bracket 39. The forward portion of bar 36 is provided with similarly projecting upper and lower longitudinally spaced flanges 44 and 46, respectively, and the bracket reciprocably supporting bar member 36 also mounts a latch element 47 supported for turning movement on a horizontal pivot axis afforded by an attaching bolt 48. Latch element 47 is formed from a rectangular piece of flat stock (note Fig. 3) and has its opposite end edges angularly recessed to present diagonally opposite pointed ends 49, 51 and diagonally cutoff or blunt ends 52 and 53. The outer side surface of element 47 is positioned in adjacent parallel relation to the inner vertical surface of bar 36, and it will be noted (see Fig. 4) that the width of this latch element is somewhat less than the longitudinal spacing of the adjacent edges of the upper and lower flanges 44 and 46. In this connection, it should also be noted that when latch element 47 is vertically disposed as shown in Fig. 4 the upper pointed and blunt ends 49 and 52, respectively, are substantially flush with the top edge of bar 36.

Referring again to Fig. 1 and also to Figs. 2 and 3, it is to be noted that the clutch means is shown in its disengaged position, that is, elements 17 and 18 are separated, and that the throttle lever control arm, that is, governor arm 31, is in its engine idling position as determined by engagement with its stop means 54, the latter being schematically shown in Fig. 2. In this position it will be noted that the upper flange 44 on bar 36 overlies the blunt end 52 of latch element 47, and that the rear edge of this flange abuts the forward side of the angled edge terminating in pointed end 49. Consequently, it should be apparent that the latch element when thus positioned prevents a further rearward movement or movement to the left of bar member 36 and of the clutch lever 32 connected therewith.

In operation, assuming that it is now desired to condition the engine for load operation and to reengage the clutch means, all that has to be done is to pull forward on a cable or rope 56 having its rear end attached to the outer end of clutch lever 32 and having its forward end attached, in any suitable manner, to or near the operator's station 4 on tractor 3. Preferably this cable passes through a guide pulley or the like 57 carried by near frame member 9. This pull on the cable moves clutch lever 32 and the rigid control bar 36 forwardly to their limiting positions shown in Fig. 4, such position being determined by engagement of the clutch lever with the forward edge of the slot 33 in housing 34. As bar member 36 approaches the limiting clutch disengaged position just described, the forward edge of lower flange 46 engages the rear side edge of latch element 47 and turns the latter to the substantially vertical position shown in Fig. 4. As previously described rod 41 is mounted for longitudinal movement relative to bar 36, and since this rod is engaged with the throttle controlling governor arm 31 which is in turn engaged with the stop means 54, a movement of bar 36 from the position shown in Fig. 3 to the position shown in Fig. 4 merely operates to compress spring 42. With the parts thus positioned release of cable 56 enables the clutch biasing spring 19 to move shiftable clutch element 18 into firm engagement with the longitudinally fixed complementary element 17 which in turn moves clutch lever 32 and thereby bar 36 rearward or toward the left as seen on the accompanying drawing. During the initial phase of this rearward clutch engaging movement of the bar 36, the rearward edge of upper flange 44 engages the forward edge of latch element 47 adjacent cutoff end 52 and turns this latch element into the horizontal position shown in Fig. 5 and this movement, effected by the action of spring 19, continues until bar 36, clutch lever 32 and clutch element 18 assume their limiting clutch engaged positions shown in Fig. 5. In effecting this movement, it is usually desirable that the relation of parts including bar 36, throttle stop means 54, spring 42, and rod 41, is such that the engine is conditioned or at least partially conditioned for load operation just prior to actual reengagement of the clutch elements, thereby avoiding a stall condition.

With the parts positioned as shown in Fig. 5 all that has to be done in order to disengage the power unit clutch and condition the engine for idling operation is to again pull forward on cable 56 whereupon the forward movement of bar 36 brings the forward edge of lower flange 46 into engagement with the rear angled recessed edge of latch element 47 adjacent the pointed end 49 thereof (note Fig. 6) which, as the forward movement of the bar 36 continues, repositions the latch element as shown in Fig. 6. When this has been done, release of cable 56 permits the clutch biasing means to move lever 32 and bar 36 rearward until the upper flange 44 on the latter engages and turns the latch element into its bar retaining relation similar to that shown in Fig. 3.

It should now be apparent that engagement or disengagement of the clutch means controlling the transmission of power from the engine to the soil or crop treating mechanism may be readily effected simply by the operator pulling forward on cable 56 as previously described. In addition it will be noted that this mode of operation may be readily effected from a remote point by means of a single reciprocable element and a single coacting latch element which together provide a simplified and compact structure that may be readily mounted on any power unit and actuated from a remote point irrespective of whether the longitudinal axis of the engine is parallel or transverse with respect to the direction of travel.

The mechanism herein disclosed for purposes of illustration may obviously be applied in the control of all sorts of power units irrespective of whether mobile or stationary, the significant feature being that they afford a remote control with a minimum of parts. Accordingly, it should be understood that it is not intended to limit the invention to the exact details of construction and arrangement of parts herein shown and described, as various modifications within the scope of the appended claims may occur to persons skilled in the art.

It is claimed and desired to secure by Letters Patent:

1. In a power unit having a clutch controlling the transmission of power from said unit to a mechanism adapted to be connected therewith, said clutch including a shiftable element and biasing means urging said shiftable element to its power transmitting position, a clutch lever operatively associated with said shiftable element for selectively moving the latter to a position interrupting the transmission of power therethrough, and having a throttle control lever including a biasing means urging said throttle lever to a preselected power output position, said throttle lever being movable a predetermined distance away from said preselected position in the same direction as said clutch lever moves in effecting an interruption of power transmission, an improved control mechanism comprising an elongated rigid element mounted on said unit for reciprocation in the general direction of said lever movement and having one end thereof pivotally connected with said clutch lever, said rigid element extending away from said clutch lever and past said throttle lever in proximity to the latter, a part carried by said rigid element in position for engagement with said throttle lever as said rigid element is moved therepast in response to a power interrupting movement of said clutch lever, said part having a lost motion connection with said rigid element effective to move said throttle lever said predetermined distance and retain the latter thus positioned as said rigid element is moved therepast in response to a movement of said clutch lever from its power transmitting position to its power interrupting position, a latching device carried by said unit and presenting a retaining element disposed alongside a portion of said rigid element in shiftable coaction therewith; said latch element retainably engaging said rigid element upon the latter having been moved therepast in a direction interrupting said power transmission and then released for return to its normal power transmitting position by the action of said biasing means and being shifted to a rigid element releasing position upon the latter again moving therepast in a power interrupting direction, said biasing means being then operative to return said levers and thereby said rigid element to their normal power transmitting positions, whereupon the next power interrupting movement thereof shifts said latch element to its position for retainable engagement with said rigid element, and means for effecting a power interrupting movement of said clutch lever.

2. In a power unit having a clutch controlling the transmission of power from said unit to a mechanism adapted to be connected therewith, said clutch including a shiftable element and biasing means urging said shiftable element to its power transmitting position, a clutch lever operatively associated with said shiftable element for selectively moving the latter to a position interrupting the transmission of power therethrough, and having a throttle control lever including a biasing means urging said throttle lever to a preselected power output position, said throttle lever being movable a predetermined distance away from said preselected position in the same direction as said clutch lever moves in effecting an interruption of power transmission, an improved control mechanism comprising flexible means adapted to be attached to said clutch lever and extending to a remote point and being responsive to a pull thereon to move said clutch lever forwardly to a clutch disengaged position, an elongated rigid element pivotally attached to said clutch lever and movable longitudinally therewith, a latching device carried by said unit and coacting with said rigid element for sequentially latching said rigid element and thereby maintaining said clutch lever in disengaged position in response to a first pull and release of said flexible means, and unlatching said rigid element in response to a second pull and release of said flexible means, said rigid element including a U-part attached at the base thereof to said rigid element and presenting transversely extending legs longitudinally slidably receiving a rod member, a transversely extending pin element attached to said rod member between said legs and serving as a stop limiting the forward longitudinal movement of said rod relative to said rigid element, and a compression spring mounted about said rod between one of said legs and said pin and biasing said rod forwardly, said rod coacting with said throttle lever to maintain same said predetermined distance when said rigid element is positioned in said latching position and in positions forward thereof.

3. In a power unit having a clutch controlling the transmission of power from said unit to a mechanism adapted to be connected therewith, said clutch including a shiftable element and biasing means urging said shiftable element to its power transmitting position, a clutch lever operatively associated with said shiftable element for selectively moving the latter to a position interrupting the transmission of power therethrough, and having a throttle control lever including a biasing means urging said throttle lever to a preselected power output position, said throttle lever being movable a predetermined distance away from said preselected position in the same direction as said clutch lever moves in effecting an interruption of power transmission, an improved control mechanism comprising flexible means adapted to be attached to said clutch lever and extending to a remote point and being operative in response to a pull thereon to move said clutch lever longitudinally forward to a clutch disengaged position, an elongated rigid element pivotally attached to said clutch lever and movable longitudinally in response to movement of said clutch lever, a latching device carried by said unit and including a movable latch member, said latching device longitudinally slidably receiving said rigid element and coacting therewith for sequentially latching said rigid element to said movable member in response to a pull on said flexible means and a release and partial rearward movement of said rigid element by said clutch biasing means and thereby retaining said clutch in disengaged position; and unlatching said rigid element from said movable member in response to a pull on said flexible means and a release resulting in a full rearwardly movement of said rigid element by said clutch biasing means thereby reengaging said clutch, said rigid element including a longitudinally slidably mounted rod biased in a forwardly direction, said rod coacting with said throttle lever to move same said predetermined distance when said clutch is moved to disengaged position, said rod remaining stationary against said throttle lever and maintaining same said predetermined distance during any period said clutch remains disengaged despite any further forward movement of said rigid element.

4. In a power unit having a clutch controlling the transmission of power from said unit to a mechanism adapted to be connected therewith, said clutch including a shiftable element and biasing means urging said shiftable element to its power transmitting position, a clutch lever operatively associated with said shiftable element for selectively moving the latter to a position interrupting the transmission of power therethrough, and having a throttle control lever including a biasing means urging said throttle lever to a preselected power output position, said throttle lever being movable a predetermined distance away from said preselected position in the same direction as said clutch lever moves in effecting an interruption of power transmission, an improved control mechanism comprising a flexible line adapted to be attached to said clutch lever and extending to a remote point and being responsive to a pull thereon to move said clutch lever forwardly to a clutch disengaged position, latch means adapted to be carried by said unit and including a movable latch member, an elongated rigid element pivotally attached to said clutch lever and movable longitudinally in response to movement of said clutch lever, said rigid element being longitudinally reciprocally received within said latch means and presenting longitudinally spaced portions coacting with said latch means sequentially to rotate said latch member to latching relation with said rigid element for preventing longitudinal movement of said rigid element rearwardly and thereby maintaining said clutch in disengaged position, to rotate said latch member to a first mid-latch position in response to a forwardly longitudinal movement of said rigid element, to rotate said latch member to a mid-latch position in response to a rearward movement of said rigid element by said clutch biasing means, to rotate said latch member to a second mid-latch positioning by a forwardly movement of said rigid element, and to rotate said latch member to said latching relation by a rearwardly movement of said rigid member by said clutch biasing means, said rigid element including a U-part attached at the base thereof to said elongated member, said U-part presenting legs longitudinally slidably receiving a rod member, a transversely extending pin element attached to said rod between said legs and serving as a stop limiting the forward longitudinal movement of said rod relative to said rigid element, and a compression spring mounted about said rod between one of said legs and said pin element and biasing said rod in a forwardly direction, said rod coacting with said throttle lever to maintain same said predetermined distance when said rigid element is positioned in said latching relation and in positions forwardly thereof.

ROBERT L. WORRELL.
HARRY J. LEHKER.
FRANCIS H. VOGELSANG.

References Cited in the file of this patent
UNITED STATES PATENTS

| Number | Name | Date |
|---|---|---|
| 1,455,676 | Stark | May 15, 1923 |
| 1,467,658 | Thomson | Sept. 11, 1923 |
| 1,651,986 | Ashbaugh | Dec. 6, 1927 |
| 2,140,109 | Kellar | Dec. 13, 1938 |
| 2,171,456 | Sampson | Aug. 29, 1939 |
| 2,533,967 | Sobie | Dec. 12, 1950 |

FOREIGN PATENTS

| Number | Country | Date |
|---|---|---|
| 594,981 | Great Britain | Nov. 24, 1947 |